US009191496B1

(12) United States Patent
Barrett et al.

(10) Patent No.: US 9,191,496 B1
(45) Date of Patent: Nov. 17, 2015

(54) DIGITAL SUBSCRIBER LINE FAULT LOCATING SYSTEMS AND METHODS

(71) Applicants: Robert A. Barrett, Madison, AL (US); Joshua S. Brown, Madison, AL (US); Christopher Ryan Hodges, Huntsville, AL (US); Emir Adanur, Madison, AL (US)

(72) Inventors: Robert A. Barrett, Madison, AL (US); Joshua S. Brown, Madison, AL (US); Christopher Ryan Hodges, Huntsville, AL (US); Emir Adanur, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 14/259,069

(22) Filed: Apr. 22, 2014

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC .............. *H04M 3/30* (2013.01); *H04M 3/2209* (2013.01)

(58) Field of Classification Search
CPC .......... H04M 3/30; H04M 3/08; H04M 3/305; H04M 3/2209; H04M 1/24
USPC ....................... 379/1.03, 1.04, 4, 14.01, 15.05
See application file for complete search history.

(56) References Cited

U.S. PATENT DOCUMENTS

| 6,975,706 | B1 | 12/2005 | Joffe et al. |
| 7,023,963 | B1 | 4/2006 | Chu et al. |
| 7,174,488 | B1 | 2/2007 | Chu |
| 7,460,498 | B2 | 12/2008 | Hunt et al. |
| 2002/0106076 | A1* | 8/2002 | Norrell et al. ............ 379/399.01 |
| 2002/0110221 | A1* | 8/2002 | Norrell et al. ............ 379/22.03 |
| 2003/0045240 | A1* | 3/2003 | Bogardus et al. .......... 455/67.1 |
| 2008/0298444 | A1* | 12/2008 | Cioffi et al. ................. 375/222 |

FOREIGN PATENT DOCUMENTS

| EP | 2066041 A1 | 6/2009 |
| EP | 1733506 B1 | 8/2012 |
| WO | WO 2009/012358 A1 | 1/2009 |
| WO | WO 2013/137853 A1 | 9/2013 |

\* cited by examiner

*Primary Examiner* — Quoc D Tran
(74) *Attorney, Agent, or Firm* — Maynard Cooper & Gale, P.C.; Jon E. Holland

(57) ABSTRACT

Systems and methods for locating faults in a digital subscriber line (DSL) system in accordance with the disclosure include a handshake messaging procedure that is used to rapidly obtain interconnectivity information of various subscriber loops that are present in a DSL repeater chain. The interconnectivity information is used to provide an identification of one or more faulty loops when such faulty loops are present in the DSL repeater chain. The identification may be provided in the form of a topological representation that can be used to execute targeted line testing procedures on the faulty loops without wasting time on testing loops that are not faulty.

21 Claims, 7 Drawing Sheets

DIGITAL SUBSCRIBER LINE FAULT LOCATING SYSTEMS AND METHODS

RELATED ART

A digital subscriber line (DSL) system typically includes a DSL apparatus, such as a digital subscriber line access multiplexer (DSLAM), that is located in a central office (CO) or at an intermediate point between a CO and one or more customer premises. The DSL apparatus is often communicatively coupled to a customer premises equipment (CPE), such as a DSL modem, via a subscriber loop that is implemented using twisted pair wiring. The twisted pair wiring is used to not only transport DSL signals but to simultaneously transport telephone voice traffic as well. Unfortunately, this twisted pair wiring is sometimes susceptible to various anomalies such as short circuits, open circuits and ground faults that may lead to an interruption of DSL service.

Consequently, a traditional line fault detection system may be deployed at a central office in order to troubleshoot and detect the presence of one or more defects that may be present in the twisted pair wiring provided from the central office. While such a traditional line fault detection system may be fairly effective in locating one or more faults in the twisted pair wiring directly emanating from the central office, the traditional system may prove ineffective for troubleshooting other sections of the twisted pair wiring used to communicatively couple the DSL apparatus to the CPE.

To elaborate upon this aspect—as is known, bandwidth constraints associated with twisted pair wiring place limitations upon the maximum distance over which an effective DSL signal can be delivered. Therefore, where warranted, a DSL system may employ a chain of DSL repeaters in order to extend DSL signal reach. The individual DSL repeaters in the chain of DSL repeaters are interconnected to each other by twisted pair wiring, each of which may be referred to as a section of the subscriber loop.

While the traditional line fault detection system that is deployed at the central office may be useful in troubleshooting one or more sections of the subscriber loop that are associated with the chain of repeaters, in certain cases, some of these repeaters may be inaccessible from the central office (for example as a result of loss of power at the repeaters, or inadequate powering of the repeaters), and consequently, sections of the subscriber loop associated with these inaccessible repeaters may be untestable from the central office.

It is therefore generally desirable to address this, and other such issues, in existing line fault detection systems.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects that are generally understood by persons of ordinary skill in the art. For example, words such as "loop," "line," "span," "segment," "section" and "subscriber loop" that are used variously and interchangeably in this disclosure, are generally directed to DSL transport media, and more particularly directed to the twisted pair wiring used for interconnecting various DSL-related elements located in and between a central office and a customer premises. Also, it should be understood that the word "example" as used herein is intended to be non-exclusionary and non-limiting in nature. More particularly, the word "exemplary" as used herein indicates one among several examples, and it must be understood that no extraordinary emphasis or preference is being directed to the particular example being described. Furthermore, it should be understood that the phrase "test system" as used herein is implementable in a variety of ways that separately or combinedly incorporate hardware in various forms with software, firmware, or other forms of computer-implementable code stored in a computer-readable storage medium.

Turning now to a general description of the disclosure, the various example embodiments described herein are generally directed to systems and methods pertaining to detecting one or more faulty loops amongst a plurality of loops, followed by targeted line testing to determine the specific location of one or more faults on each of the faulty loops.

More particularly, in accordance with the disclosure, a handshake messaging procedure may be used first to obtain interconnectivity information of various loops that may be present in a DSL repeater chain. The interconnectivity information may be used to generate a topological representation that provides an identification of one or more faulty loops when such faulty loops are present in the DSL repeater chain. The topological representation may then be used to execute targeted line testing procedures on the faulty loops without wasting time on testing loops that are not faulty. These aspects, as well as other aspects, are described below in further detail using the various figures.

Figure 1:
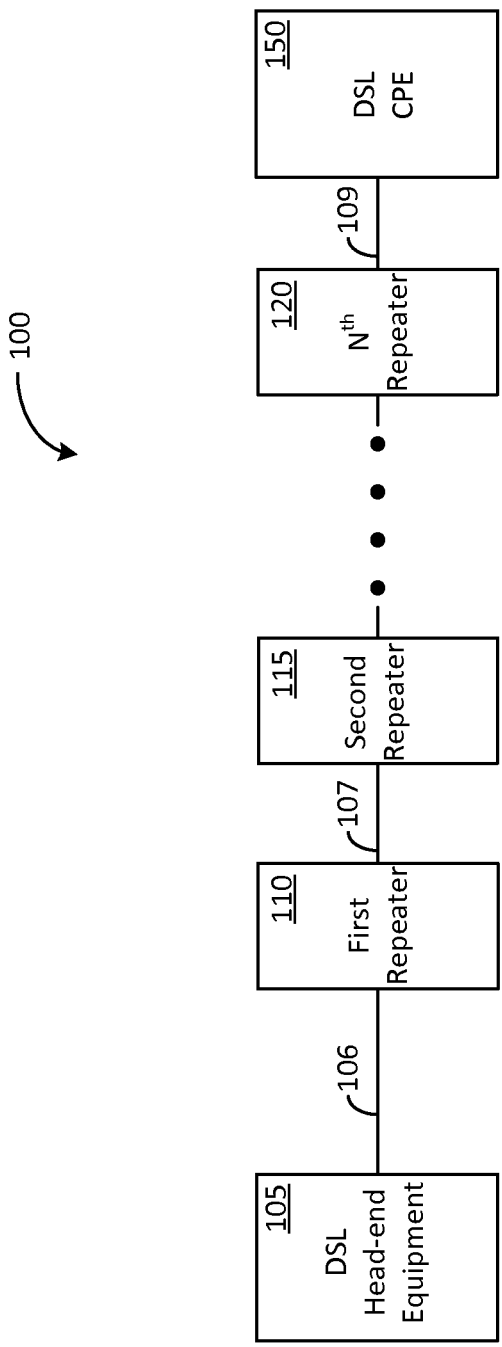
FIG. 1 shows an exemplary embodiment of a DSL system that may incorporate a DSL line fault locating system in accordance with the disclosure.

Attention is first drawn to FIG. 1, which shows a first exemplary embodiment of a DSL system 100 that may incorporate a DSL fault location system in accordance with the disclosure. The DSL system 100 includes a DSL head-end equipment 105 that is typically located in a central office (CO) or at an intermediate point between a CO and one or more customer premises. The DSL head-end equipment 105, which can be a digital subscriber line access multiplexer (DSLAM) in some embodiments and various other types of equipment in other embodiments, is coupled to a chain of "N" repeaters (N≥1).

More particularly, the DSL head-end equipment 105 is coupled to a first repeater 110 via a first subscriber loop 106. The first repeater 110 may be coupled to a second repeater 115 via a second subscriber loop 107. The second repeater 115 may be further coupled to additional repeaters (such as the one indicated as an "$N^{th}$" repeater 120). The "$N^{th}$" repeater 120 is coupled via an "$N^{th}$" subscriber loop 109 to a DSL customer premises equipment (CPE) 150.

In one exemplary embodiment, the DSL CPE 150 can be a DSL modem located in a residential structure, while in other embodiments, the DSL CPE 150 can be DSL modem or other equipment located in a non-residential environment such as an office or a commercial building. It will be understood that the various subscriber loops, such as the subscriber loop 106, the subscriber loop 107, and the subscriber loop 109 may be collectively considered as a DSL subscriber loop network interconnecting the chain of repeaters (first repeater 110, second repeater 115, and "$N^{th}$" repeater 150). It may also be pertinent to point out that DSL signal propagation from the DSL head-end equipment 105 towards the DSL CPE 150 is generally referred to in the industry as "downstream" transmission, while DSL signal propagation in the opposite direction is generally referred to as "upstream" transmission.

As is known in the art, during a traditional start-up process, the DSL head-end equipment 105 communicates with the first repeater 110 in order to initiate a first training phase that incorporates a first set of training sequences to determine the transmission characteristics of the first subscriber loop 106. The determined transmission characteristics of the first subscriber loop 106 are used to select suitable upstream and downstream transmission bandwidths for bi-directional DSL signal propagation between the DSL head-end equipment 105 and the first repeater 110.

Upon completion of the first training phase between the DSL head-end equipment 105 and the first repeater 110, a second training phase is similarly initiated between the first repeater 110 and the second repeater 115. Upon completion of the second training phase, additional training phases are executed upon each of the other subscriber loops in the chain of repeaters so as to enable an acceptable end-to-end DSL signal connectivity.

If the training proves successful from end-to-end (i.e., from the DSL head-end equipment 105 all the way to the DSL CPE 150) normal DSL data transfer is started and DSL communications is established between the DSL head-end equipment 105 and the DSL CPE 150 during a phase typically referred to as the "data phase." On the other hand, if a training sequence fails on a subscriber loop after some number of unsuccessful retries, the traditional procedure typically necessitates a truck rollout wherein a repair technician is dispatched to travel from one repeater to another repeater in order to identify the defective subscriber loop and troubleshoot the defective subscriber loop for locating one or more faults.

As can be appreciated in this traditional approach, a significant time delay occurs not only as a result of having to conduct the training procedure in order to locate a fault in the system, but also as a result of having to use the repair technician thereafter to physically go out and find one or more faulty loops among the many loops that may be present between the DSL head-end equipment 105 and the DSL CPE 150. A further delay is caused as a result of the technician having to conduct line fault testing on one or more faulty loops to identify the specific location and nature of one or more faults that may be present in each of the one or more faulty loops.

Consequently, it is not only desirable to eliminate or reduce the time delay associated with the training phase, but to also eliminate the truck rollout associated with dispatching the repair technician thereafter. Towards this end, and in accordance with the disclosure, a faulty line may be detected from either the central office or the customer premises, by using a handshake signal prior to the start of the training phase. Starting the handshake signal prior to starting the training phase provides a faster identification of specific subscriber loops that may be faulty among the many subscriber loops that are present between the DSL head-end equipment 105 and the DSL CPE 150.

It is preferable that the handshake signal not only be reliable and robust, but also adaptable to existing industry wide procedures and practices. More particularly, it is preferable that the handshake signal conform to one or more industry standards that are known to be reliable and robust, thus making the adaptation of the handshake signal with minimal modification, appealing for use by a wide variety of users. In exemplary embodiments, a set of signals that are standardized in the art and referred to in the industry as the ITU-T G.99x Recommendations is used for this purpose. It may be pertinent to point out that the "x" in "G.99x" as used herein, is indicative of various versions and revisions to the standards. The ITU-T G.99x Recommendations are incorporated into this disclosure by reference in their entirety.

Handshake signals conforming to the ITU-T G.99x Recommendations are typically executed prior to executing the training phase in DSL systems such as the DSL system 100 shown in FIG. 1. Typically, a handshaking procedure (utilizing the handshaking signals conforming to the ITU-T G.99x Recommendations) is carried out between two DSL communication elements (such as the DSL head-end equipment 105 and the first repeater 110) when either element is first powered up. The details of the format and operation of the traditional handshaking process will not be elaborated upon herein in order to avoid distracting from certain other primary aspects of the disclosure.

Nonetheless, attention is drawn to certain messages that are in accordance with the ITU-T G.99x Recommendations. Specifically, attention is drawn to messages such as, for example, the Capabilities List (CL), the Mode proposal (MP), the Mode select (MS), the Capabilities list (CL), and the Capabilities List+request (CLR) messages that are defined for example in the ITU-T G.994.1 Recommendations. Each of these messages may optionally include a non-standard (NS) information field that can be used to convey non-standard information beyond what is defined in the Recommendations.

In one exemplary implementation in accordance with the disclosure, the NS field is used to transport interconnectivity information pertaining to the various subscriber loops shown in the DSL system 100 during the execution of a handshake procedure for loop testing purposes.

The handshaking procedure may be executed from either the central office or the customer premises. For example, the handshaking procedure may be initiated from the customer premises by configuring the DSL CPE 150 to transmit a handshake request signal to the "$N^{th}$" repeater 120. If the "$N^{th}$" subscriber loop 109 is not faulty, the handshake request signal is received by the "$N^{th}$" repeater 120 and a response in the form of a handshake response signal is transmitted back by the "$N^{th}$" repeater 120 to the DSL CPE 150.

Upon receiving the handshake response signal, the DSL CPE 150 recognizes that the "$N^{th}$" subscriber loop 109 is not faulty. On the other hand, if the handshake response signal is not received by the DSL CPE 150, a line fault locating test procedure is started from the DSL CPE 150 to identify the specific location and nature of one or more faults in the "$N^{th}$" subscriber loop 109 and/or to identify a fault in the "$N^{th}$" repeater 120. Among various line fault locating test procedures that may be used for this purpose, one procedure includes the use of a time domain reflectometer (TDR).

After the DSL CPE 150 detects that that the "$N^{th}$" subscriber loop 109 is not faulty, the "$N^{th}$" repeater 120 executes a similar handshaking procedure with a "($N^{th}$−1)" repeater (not shown). This procedure is followed by each of the succeeding upstream repeaters executing the handshaking procedure with their neighboring upstream repeaters. The handshaking procedure may be terminated when the first repeater 110 has completed interacting with the DSL head-end equipment 105 for testing the subscriber loop 106, or may be terminated earlier at any repeater in the chain of repeaters if so desired.

The results of the entire handshaking process among the various elements of the DSL system 100 may be used to generate a topological representation of the DSL system 100 (or a portion of the DSL system 100 such as the chain of repeaters). The topological representation provides a convenient and quick overview of the health of the DSL system 100 in terms of faulty loops.

For example, the topological representation may indicate that the subscriber loop 107 is faulty whereas the other subscriber loops, including the subscriber loop 109, are not faulty. The fault indication provided by the topological representation may be used to perform a targeted test (such as a TDR test), upon the subscriber loop 107 to identify the nature and location of a fault in the subscriber loop 107. In this example, the subscriber loop 109 may not be subjected to the TDR test or may be tested later if such a further test is desired.

The targeted test is carried out by an element that is directly connected to the faulty loop. For example, when the subscriber loop 107 is faulty, the targeted test may be executed by the second repeater 115, using a test system that is located in the second repeater 107. Further details on this subject are provided below in the description related to FIG. 2.

The generation of the topological representation in accordance with the disclosure, may be implemented in a variety of ways. Some of these ways may be directed at providing a human-readable representation such as, for example, a graphical representation, a numerical representation, a group of bits, a table, or a chart. The group of bits for example, may include one or more "zeros" indicative of one or more subscriber loops that are not faulty and one or more "ones" indicative of one or more subscriber loops that are faulty. Other such numerical and/or alphanumeric patterns may be used to indicate normal and faulty subscriber loops. In other cases, the topological representation may be directed at providing a machine-readable representation such as, for example, suitable instructions in software code that is executable by a processor. In some embodiments, the machine-readable representation may be derived directly from the results of the handshaking procedure without human intervention and the testing of the faulty loop may also be started subsequently without human intervention as well.

Irrespective of the manner in which the topological representation is generated and used, the targeted testing of a faulty loop is carried out by one of the devices that is directly connected to the faulty loop.

Figure 2:
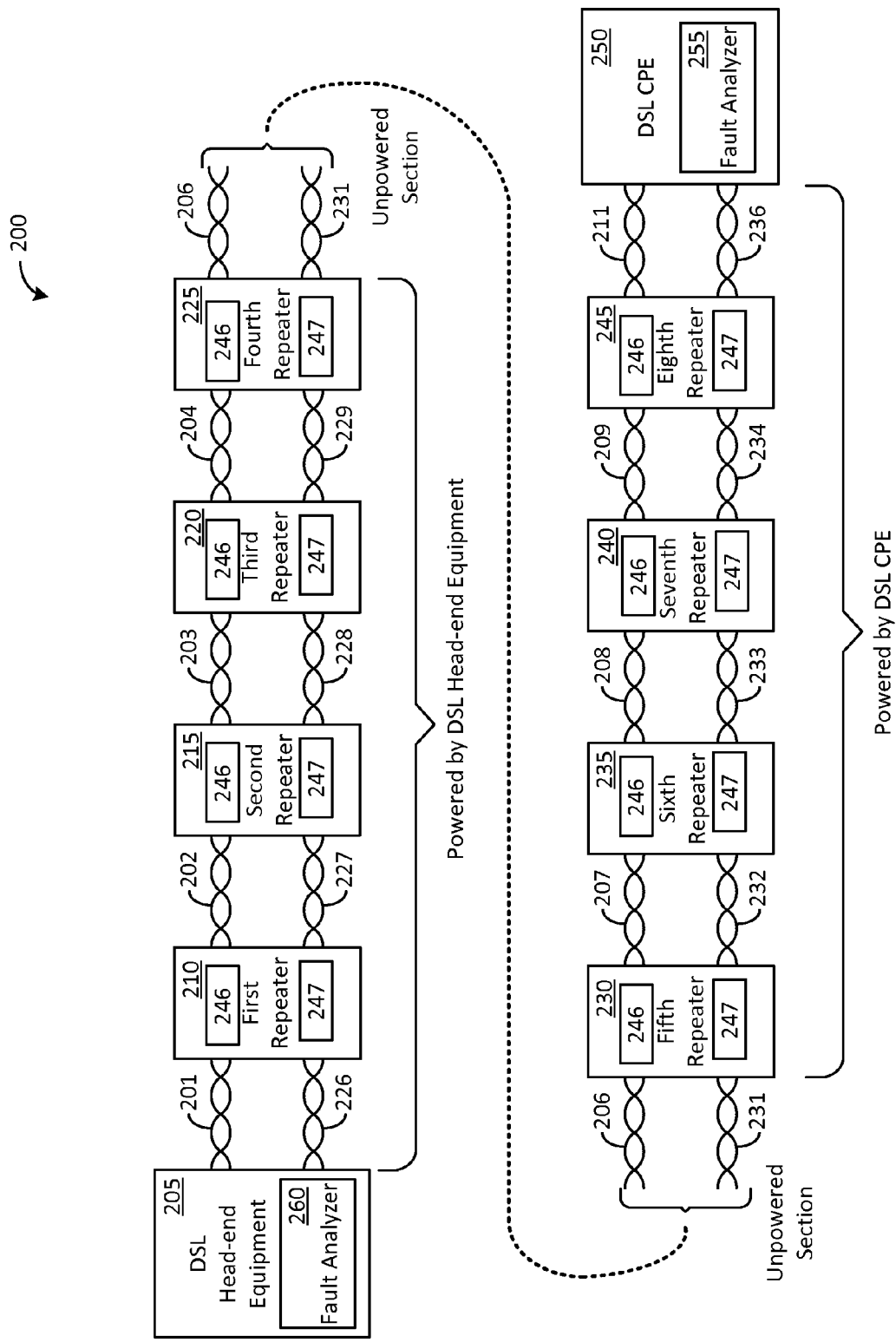
FIG. 2 shows another exemplary embodiment of a DSL system that may incorporate a DSL line fault locating system in accordance with the disclosure.

Attention is now drawn to FIG. 2, which shows a second exemplary embodiment of a DSL system 200 that may incorporate a DSL fault location system in accordance with the disclosure. The DSL system 200 includes a DSL head-end equipment 205 that is typically located in a central office (CO) or at any suitable intermediate point between a CO and one or more customer premises. The DSL head-end equipment 205, which can be a digital subscriber line access multiplexer (DSLAM) in some embodiments and various other types of equipment in other embodiments, is coupled to a chain of "N" repeaters (N≥1). In this exemplary embodiment, N=8.

More particularly, the DSL head-end equipment 205 is coupled to a first repeater 210 via a pair of subscriber loops, specifically a subscriber loop 201 and a second subscriber loop 226. The first repeater 210 is coupled to additional repeaters, as shown. Each repeater is coupled to a neighboring repeater by a pair of subscriber loops. Eighth repeater 245 is coupled to a DSL CPE 250 via a subscriber loop 211 and a subscriber loop 236.

In one exemplary embodiment, the DSL CPE 250 can be a DSL modem located in a residential structure, while in other embodiments, the DSL CPE 250 can be DSL modem or other equipment located in a non-residential environment such as an office or a commercial building.

As is known, line-powering techniques are generally employed to operate repeaters that are located away from the central office at remote locations where power is not readily available. As is also known, there are constraints associated with line powering, such as for example, the maximum allowable voltage level that can be applied to a subscriber loop and an undesirable level of voltage drop caused by an impedance of the subscriber loop over which the power is provided. For example, a subscriber loop that is very long, or a subscriber loop that has relatively high impedance, causes a significant voltage drop to an extent where the power reaching a repeater may be insufficient to operate the repeater. Consequently, in industry practice, the number of repeaters that can be line-powered from a central office is limited by various such constraints.

In the exemplary embodiment shown in FIG. 2, a first set of four repeaters is line powered by the DSL head-end equipment 205. Specifically, the first repeater 210, the second repeater 215, the third repeater 220, and the fourth repeater 225 are line powered by the DSL head-end equipment 205. It will be understood that in other embodiments a larger number or a fewer number of repeaters can be line powered by the DSL head-end equipment 205 based on various factors.

Furthermore, in the exemplary embodiment shown in FIG. 2, a second set of four repeaters is line powered by the DSL CPE 250. Specifically, the fifth repeater 230, the sixth repeater 235, the seventh repeater 240, and the eighth repeater 245 are line powered by the DSL CPE 250. The powering scheme used for the second set of repeaters may be referred to as back-powering.

The subscriber loop 206 and the subscriber loop 231 that interconnect the fourth repeater 225 and the fifth repeater 230 do not carry power because the fourth repeater 225 is operational via the power provided by the DSL head-end equipment 205, while the fifth repeater 230 is operational via the back powering from the DSL CPE 250.

The DSL head-end equipment 205 includes a fault analyzer 260 that is configured to interpret the results of a handshake procedure initiated from the DSL head-end equipment 205, and to generate therefrom, a topological representation of at least a portion of the DSL system 200. In one embodiment, the topological representation includes only the first set of repeaters 210, 215, 220, and 225. However, in other embodiments, the topological representation can additionally include other elements, such as, for example, any of the second set of repeaters 230, 235, 240, and 245.

At the customer premises end of the DSL system 200, the DSL CPE 250 includes a fault analyzer 255 that is also configured to interpret the results of a handshake procedure initiated from the DSL CPE 250, and generate therefrom, a similar or different topological representation.

The results of the handshake procedure initiated from the DSL CPE 250, and/or the topological representation generated therefrom, may be propagated from the DSL CPE 250 to the DSL head-end equipment 205 by using the same handshake signal format that was used for performing the handshake procedure.

In one exemplary embodiment, the results of the handshake procedure are propagated from the DSL CPE 250 to the DSL head-end equipment 205 by using a handshake signal that conforms to one or more of the ITU-T G.99x Recommendations. For example, the non-standard (NS) field in one or more messages may be used for conveying the results of the handshake procedure.

More particularly with reference to the exemplary embodiment shown in FIG. 2, the maximum number of repeaters that may be tested is only eight. Consequently, the non-standard (NS) field can be used to carry a small number of bits for conveying the results of the handshake procedure. The size of the small number of bits can be determined as follows: each of the eighteen subscriber loops (201 through 211, and 226 through 236) may be uniquely represented by 5 binary bits. One or more additional bits may be used in conjunction with each of the 5 binary bits to indicate the fault status (for example, normal or faulty) of each of the subscriber loops. Thus, the small number of bits used in the fault testing related messages carried in the non-standard (NS) field can be as small as six or seven bits.

Attention is now drawn to the eighth repeater 245, particularly to functional block 246. Functional block 246 represents repeater circuitry that receives signals from the subscriber loop 211, amplifies the signals appropriately, and then propagates the amplified signals into subscriber loop 209. The repeater circuitry in the functional block 246 is further configured to receive signals propagated in the opposite direction, i.e., from the subscriber loop 209, amplify the signals appropriately, and then propagate the amplified signals into subscriber loop 211.

The eighth repeater 245 further includes another functional block 247 that represents repeater circuitry for receiving signals from the subscriber loop 236, amplifying the signals appropriately, and then propagating the amplified signals into subscriber loop 234. The functional block 247 is further configured to receive signals propagated in the opposite direction, i.e., from the subscriber loop 234, amplify the signals appropriately, and then propagate the amplified signals into the subscriber loop 236.

Each of the functional blocks 246 and 247 operate independent of each other thereby accommodating independent bi-directional signal transmission between a first pair of subscribe loops 209 and 211 and a second pair of subscribe loops 234 and 236. Such a configuration permits performing of the handshake procedure and/or the line fault testing on one pair of subscriber loops and transmitting the results of the testing on the other pair of subscriber loops. Consequently, for example, if the handshake procedure and/or the line fault testing indicate one or both of the subscriber loops 209 and 211 being faulty, the results can be propagated to the DSL head-end equipment 205 via the other pair of subscriber loop 234 and 236. Such an arrangement provides a higher probability that test results can be effectively propagated to the DSL head-end equipment 205 via a normally operating set of subscriber loops.

It will be understood that each of the functional blocks 246 and 247 shown in each of the repeaters 210, 215, 220, 225, 230, 235, 240 and 245 operate in a substantially similar manner as described above. Consequently, the results of executing a handshake procedure and/or a line fault testing upon any one or more of the subscriber loops 201, 202, 203, 204, 206, 207, 208, 209, and 211 can be propagated to the DSL head-end equipment 205 via subscriber loops 236, 234, 233, 232, 231, 229, 228, 227, and 226; and vice-versa.

Figure 3:
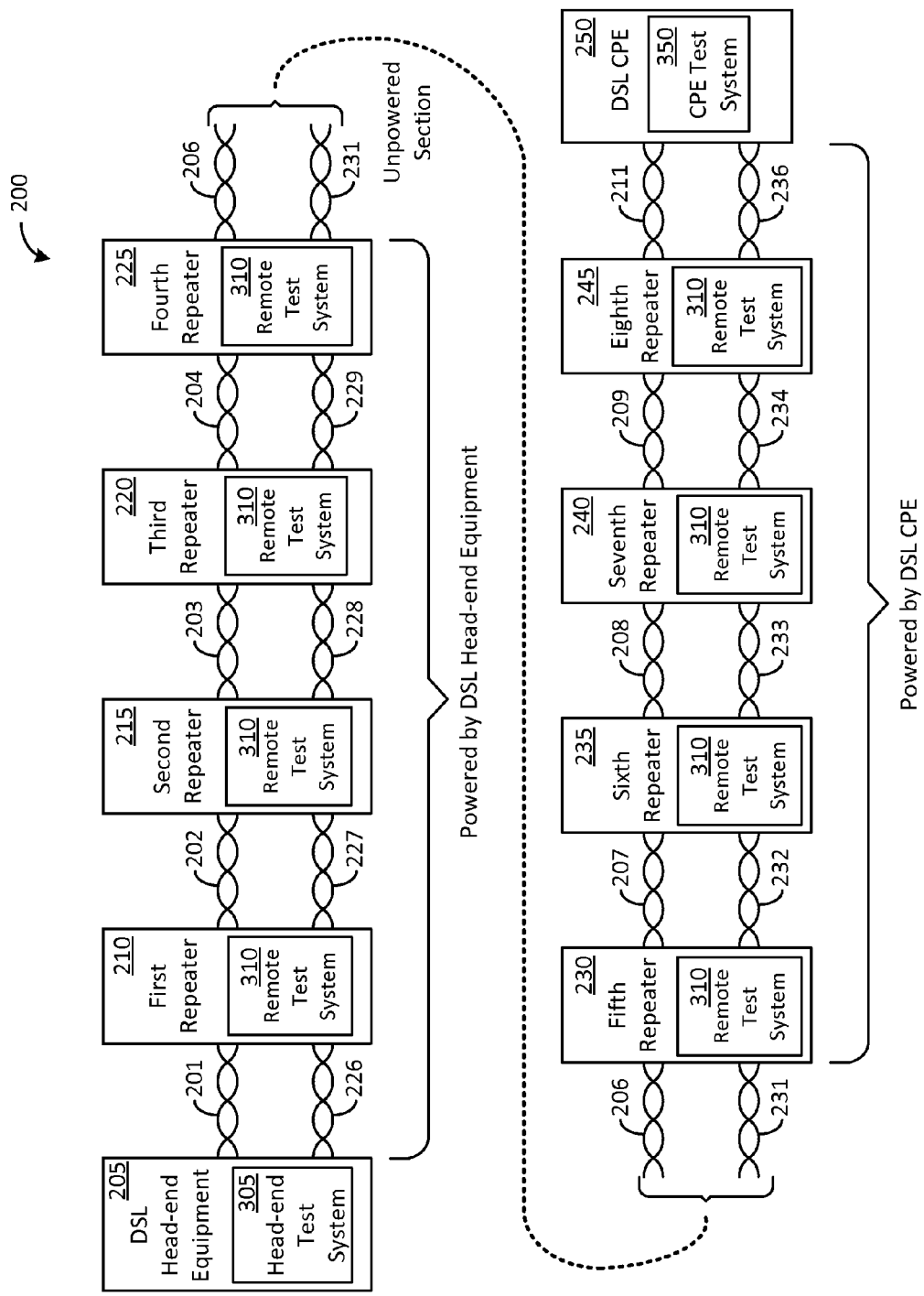
FIG. 3 shows a few exemplary functional blocks of a DSL line fault locating system incorporated into the DSL system shown in FIG. 2.

FIG. 3 shows the DSL system 200 including a few other exemplary functional blocks of a DSL line fault locating system in accordance with the disclosure. The DSL head-end equipment 205 includes a head-end test system 305, which may, in some embodiments, be integrated with the fault analyzer 260 shown in FIG. 2.

The head-end test system 305, which may incorporate one or more elements that may be implemented in hardware, software, firmware, or in various combinations thereof, is configured to execute a line fault test procedure. The line fault test procedure uses the handshake procedure described above, to acquire information that is interpreted by the fault analyzer 260 in order to generate the topological representation of the DSL system 200 or a portion of the DSL system 200 (for example, the chain of repeaters).

Each of the repeaters includes a remote test system 310 configured to execute a line fault locating test procedure (such as a TDR test) under command from the head-end test system 305 that is communicatively coupled to each of the remote test systems 310 via the plurality of subscriber loops. Each remote test system 310 may incorporate one or more elements that may be implemented in hardware, software, firmware, or in various combinations thereof. The operation of the head-end test system 305 and the various remote test systems 310 will now be described in more detail by using an exemplary test process that may be executed from either the central office or the customer premises.

In this particular example, the handshaking procedure is initiated from the customer premises by configuring the DSL CPE 150 to transmit a handshake request signal to the eighth repeater 245 via one of the pair of subscriber loops that interconnect the DSL CPE 250 to the eighth repeater 245. For example, the handshake request signal may be transmitted to the eighth repeater 245 via the subscriber loop 211.

If the subscriber loop 211 is not faulty, the handshake request signal is received by the eighth repeater 245 and a response in the form of a handshake response signal is transmitted by the eighth repeater 245 back to the DSL CPE 150 via the subscriber loop 211. A suitable waiting period may be employed to provide adequate time for the eighth repeater 245 to receive the handshake request signal and to transmit the handshake response signal back to the DSL CPE 150 in response. Upon receiving the handshake response signal, the DSL CPE 150 interprets this transaction as indicating that the subscriber loop 211 is not faulty.

On the other hand, if the handshake response signal is not received by the DSL CPE 150 after the waiting period, the DSL CPE 150 interprets this lack of receipt as a fault in either the subscriber loop 211 or in the eighth repeater 245. Consequently, a line fault locating test procedure, such as, for example, a TDR test is initiated by the CPE test system 350 on the subscriber loop 211. The TDR test provides information such as a location and a nature of one or more faults (such as short circuits, open circuits and ground faults) that may be present in the subscriber loop 211. If no faults are identified in the subscriber loop 211, the CPE test system 350 may conclude that the eighth repeater 245 is defective.

The results of the line fault locating test procedure conducted by the CPE test system 350 may be used and/or stored in the DSL CPE 250 for a variety of purposes, such as for example, to provide information to a repair technician for carrying out a repair on the subscriber loop 211. The result of the line fault locating test procedure may also be propagated to the DSL head-end equipment 205 either via the chain of repeaters, and/or can be retrieved by a repair technician dispatched to the customer premises for this purpose. When received at the DSL head-end equipment 205, the results of the line fault locating test procedure may be reported to a central control facility (not shown) via several different ways, such as for example via a wired or wireless communication link (not shown) coupling the DSL head-end equipment 205 to the central control facility, or via the Internet (email, for example). The central control facility may opt to send out a repair technician to rectify one or more faulty subscriber loops.

The manner in which the results of the line fault locating test procedure may be propagated to the DSL head-end equipment 205 from the DSL CPE 250 via the chain of repeaters will now be described in further detail using an example scenario wherein a line fault locating test procedure is carried out upon the subscriber loop 211. It should be understood that this example is equally applicable to testing of other subscriber loops as well.

It should be further understood that the result of line fault testing of any of the subscriber loops 201, 202, 203, 204, 206, 207, 208, 209, and 211 may be transferred upstream to the DSL head-end equipment 205 via one or more of the corresponding subscriber loops 236, 234, 233, 232, 231, 229, 228, 227 and 226. Conversely, the result of a line fault locating test procedure carried out upon one or more of the subscriber loops 236, 234, 233, 232, 231, 229, 228, 227 and 226 may be transferred upstream to the DSL head-end equipment 205 via one or more of the corresponding subscriber loops 211, 209, 208, 207, 206, 204, 203, 202 and 201.

As shown in the exemplary embodiment, the DSL system 200 provides for a pair of subscriber loops between the eighth repeater 245 and the DSL CPE 250. In one exemplary implementation, the result of the line fault locating test procedure carried out upon the subscriber loop 211 may be transferred upstream towards the DSL head-end equipment 205 via the subscriber loop 236, i.e., when the subscriber loop 236 is not faulty and the eight repeater 245 is functioning normally. The result is propagated further upstream to the DSL head-end equipment 205 via the subscriber loops 234, 233, 232, 231, 229, 228, 227, and 226.

However, transferring of the results of the line fault locating test procedure, through the subscriber loop 236, may not be feasible in certain situations when the subscriber loop 236 is damaged to a large degree (an open circuit, for example). In this case, the results may be conveyed to the central control facility from the DSL CPE 250 without using the subscriber loops, for example via email, phone, facsimile, or by using a human carrier.

On the other hand, in some cases, it may still be feasible to transfer the results of the line fault locating test procedure through the subscriber loop 236, when the subscriber loop 236 is damaged to a lesser extent (a ground fault, for example). In this situation, the use of a signal that has certain desirable characteristics may allow propagation of the result of the line fault locating test procedure via the partially faulty subscriber loop 236 irrespective of the fault. For example, the signal used for carrying the result of the line fault locating test procedure may be selected to have a suitable bandwidth that is preferably located outside a voice bandwidth used for carrying normal telephone voice traffic, but low enough to overcome high frequency attenuation in the subscriber loop 236 as a result of the fault.

In one exemplary embodiment, the result of the line fault locating test procedure is propagated through the partially faulty subscriber loop 236 via a signal that is selected to range from slightly above 4 KHz to around 5 KHz, where the 4 KHz frequency is the upper limit of the voice bandwidth that is used for carrying normal telephone voice traffic, and the 5 KHz frequency is selected to overcome an acceptable level of high frequency attenuation in the subscriber loop 236. It will be understood that the result of the line fault locating test procedure may be propagated through the subscriber loop 236 (and/or other subscriber loops) using this same signal (4 KHz to around 5 KHz) even when the subscriber loop 236 does not have any faults.

In another exemplary embodiment, the result of the line fault locating test procedure is propagated through the partially faulty subscriber loop 236 by using a signal that conforms to one or more of the ITU-T G.99x Recommendations. For example, the non-standard (NS) field in one or more messages may be used for conveying the results of the line fault locating test procedure. It will be understood that the result of the line fault locating test procedure may be propagated through the subscriber loop 236 (and/or other subscriber loops) using this same technique even when the subscriber loop 236 does not have any faults.

As described above, the handshaking procedure is initiated from the customer premises for determining whether subscriber loop 211 is faulty and upon successfully receiving the handshake response signal from the eighth repeater 245, the DSL CPE 150 interprets this as indicating that the subscriber loop 211 is not faulty.

The DSL CPE 150 may then initiate testing of other subscriber loops. For example, the DSL CPE 150 may initiate testing of the subscriber loop 209. This is carried out by configuring the eighth repeater 245 to transmit a handshake request signal to the seventh repeater 240. Upon receiving a handshake response signal from the seventh repeater 240, the eighth repeater 245 transmits this information to the DSL CPE 150, which then interprets this receipt as indicating that the subscriber loop 209 is not faulty.

On the other hand, if the handshake response signal is not received by the DSL CPE 150 before the end of a suitable waiting period, the DSL CPE 150 interprets this lack of receipt as a fault in either the subscriber loop 209 or in the seventh repeater 240. The DSL CPE 150 then communicates with the eighth repeater 245 to initiate a line fault locating test procedure, such as, for example, a TDR test, from the remote test system 310 located in the eighth repeater 245. The result of the line fault locating test procedure may be conveyed back to the DSL CPE 250 via the subscriber line 211.

The result may be used in the DSL CPE 250 for a variety of purposes, such as for example, sending out a repair technician to repair the faulty subscriber loop 209 and/or the faulty seventh repeater 240. The result of the line fault locating test procedure may also be transferred from the DSL CPE 250 to the DSL head-end equipment 205 in the various ways described above.

Upon successful completion of testing of the subscriber loop 209, the DSL CPE 150 may initiate testing of the subscriber loop 208. This is carried out by configuring the seventh repeater 240 to transmit a handshake request signal to the sixth repeater 235. Upon receiving a handshake response signal from the sixth repeater 235, the seventh repeater 240 transmits this information to the eighth repeater 245, which then forwards the information to the DSL CPE 150. The DSL CPE 250 interprets receipt of this information as indicating that the subscriber loop 208 is not faulty.

On the other hand, if the handshake response signal is not received by the DSL CPE 150 before the end of a suitable waiting period, the DSL CPE 150 interprets this lack of receipt as a fault in either the subscriber loop 208 or in the sixth repeater 235. The DSL CPE 150 then communicates with the seventh repeater 240 (via the eighth repeater 245) to initiate a line fault locating test procedure, such as, for example, a TDR test, from the remote test system 310 located in the seventh repeater 240. The result of the line fault locating test procedure is conveyed back to the DSL CPE 250 via the eighth repeater 245.

The result may be used in the DSL CPE 250 for a variety of purposes, such as for example, sending out a repair technician to repair the faulty subscriber loop 208 and/or the faulty sixth repeater 235. The result of the line fault locating test procedure may also be transferred from the DSL CPE 250 to the DSL head-end equipment 205 in the various ways described above.

The process described above may be repeated for testing one or more of the other subscriber loops and repeaters further upstream, and can be replicated for testing one or more of the subscriber loops 226, 227, 228, 229, 231, 232, 233, 234, and 236 if so desired.

The results of the handshaking procedure performed upon one or more of the repeaters may be used to generate a topological representation at any convenient time either prior to initiating the line fault locating test procedure upon a specific faulty subscriber loop, or after compiling of results to obtain a cumulative indication of the fault status of multiple subscriber loops.

Furthermore, it will be understood that the handshaking procedure may be executed prior to the occurrence of a training phase in one or more elements of DSL system 200, or prior to the completion of a training phase in one or more elements of DSL system 200. The handshaking procedure may also be executed prior to the occurrence of a re-training phase in one or more elements of DSL system 200, or prior to the completion of a re-training phase in one or more elements of DSL system 200. (The re-training phase may be initiated in certain situations, such as for example when line conditions change in one or more of the subscriber loops, or when operating conditions of one or more of the repeaters changes.) Regardless of when the handshaking procedure is executed, the techniques in accordance with the disclosure provide quicker fault related results than those that may be obtained by using a training phase technique in the traditional manner.

In addition to the advantages provided by the handshaking procedure, the line fault locating test procedure, which may follow the handshaking procedure, pinpoints one or more specific subscriber loops that are faulty, thereby permitting generation of a topological representation, which may then be used to execute targeted line testing procedures on the faulty loops without wasting time on testing loops that are not faulty. The line fault locating test procedure also eliminates the traditional need to send out a repair technician to travel from one repeater to another repeater in order to identify the defective subscriber loop and troubleshoot the defective subscriber loop for locating one or more faults.

It will be also understood that the procedures described above (wherein the handshake procedure and the line fault locating test procedure is executed in an upstream direction originating from the DSL CPE 250) may, in other embodiments, be executed in a downstream direction, originating from the DSL head-end equipment 205 instead.

Nonetheless, it will be relevant to draw attention to certain advantages provided by the line fault locating procedures described herein in comparison to traditional approaches wherein under certain fault conditions, a DSL head-end equipment would fail to have visibility into one or more repeaters that are back-powered from a DSL CPE. To elaborate upon this aspect (using FIG. 2 for purposes of convenience), let it be assumed that the sixth repeater 235 is faulty, or that the subscriber line 208 is in an open circuit fault condition. In a traditional approach, visibility into the seventh repeater 240, the eighth repeater 245 and the associated subscriber loops will be lost to the DSL head-end equipment and the DSL head-end equipment will therefore be unable to detect any faults that may exist in the seventh repeater 240, the eighth repeater 245 and the associated subscriber loops. In contrast, carrying out the line fault locating test from the DSL CPE 250 side as described herein, addresses and overcomes the handicap in the traditional approach because the seventh repeater 240, the eighth repeater 245 and the associated subscriber loops can be effectively tested from the DSL CPE 250.

Figure 4:
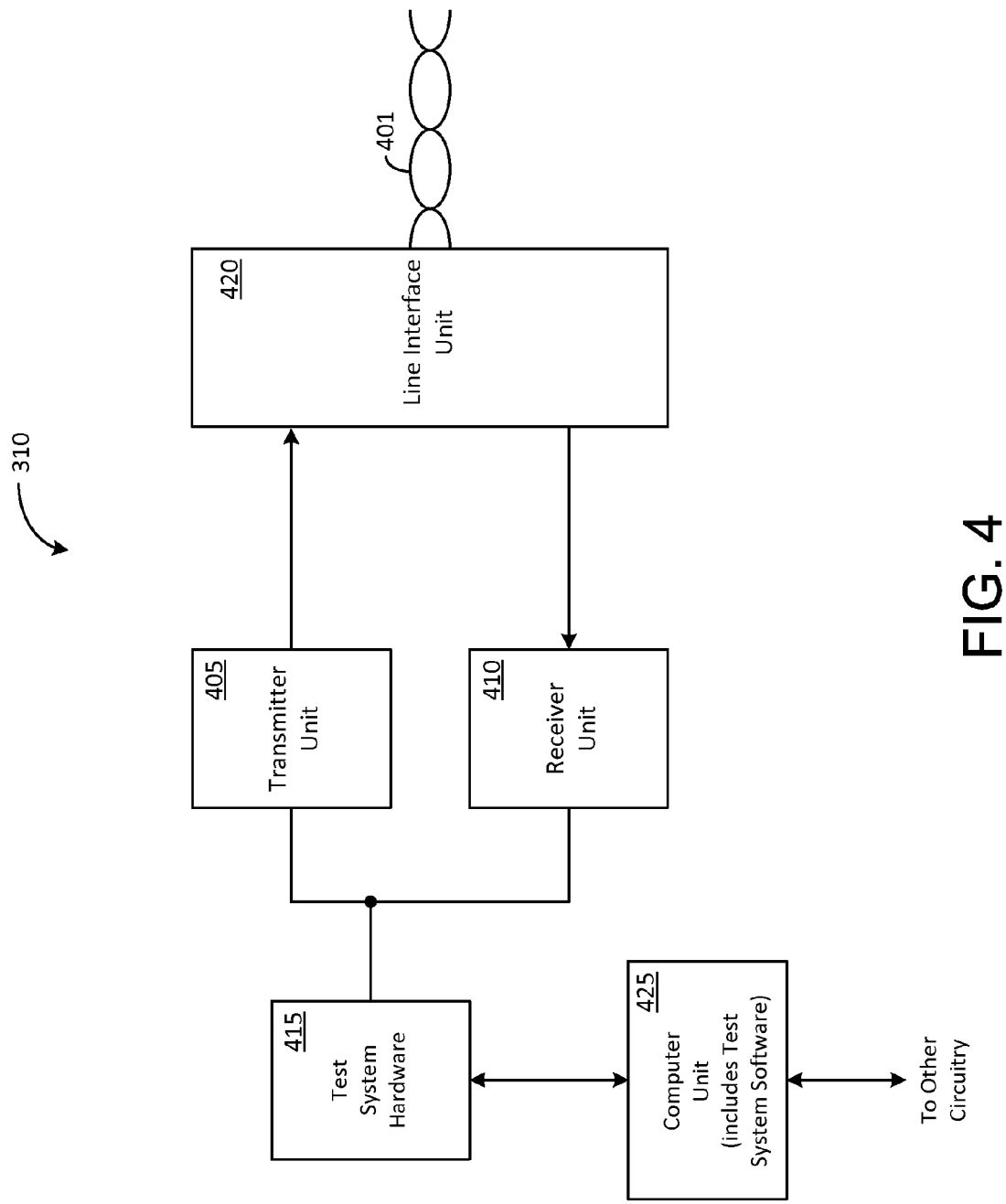
FIG. 4 shows an exemplary embodiment of a remote test system for executing some features of a digital subscriber line fault location system in accordance with the disclosure.

Attention is now drawn to FIG. 4, which shows an exemplary embodiment of a remote test system 310. Identical versions, or dissimilar versions, of the remote test system 310 may be located in each of the repeaters (shown in FIG. 3, for example). The subscriber loop 401 shown in FIG. 4 is a generic representation of any one of the subscriber loops 201, 202, 203, 204, 206, 207, 208, 209, 211, 226, 227, 228, 229, 231, 232, 233, 234, and 236.

The remote test system 310 includes a transmitter unit 405, a receiver unit 410, a line interface unit 420, test system hardware 415, and a computer unit 425 that may include test system software or other forms of computer-implementable code stored in a computer-readable storage medium. It will be understood that the various functional blocks shown in FIG. 4 are partitioned in the manner shown solely for purposes of description. Consequently, the various functional blocks may be merged together or further divided in accordance with various embodiments. For example, in certain implementations, the transmitter unit 405 may be combined with the receiver unit 410 to form a transceiver unit. In certain other implementations, the test system hardware 415 may be integrated into the transmitter unit 405 and/or the receiver unit 410. In yet other implementations, various elements contained in the functional blocks may be configured for multi-purpose use. Thus, for example, a transmitter circuit contained in transmitter unit 405 and/or a receive circuit contained in the receiver unit 410 may be used during a first instant in time for carrying out the fault test procedure in accordance with the disclosure and may be used at a different instant in time to propagate DSL data signals.

The test system hardware 415, which may include a portion used for executing a traditional handshaking procedure as done in existing art, may be specifically adapted to be multi-functional in order to execute a handshake procedure in accordance with this disclosure for obtaining interconnectivity information of various loops that are present in a DSL repeater chain. The test system hardware 415 may be configured to interact with the computer unit 425, which may store the test system software for controlling the test system hardware 415 and for processing results of the handshake procedure and other test-related activity.

The test system hardware 415 receives commands from the computer unit 425 and provides to the transmitter unit 405, a handshake request signal for testing a subscriber loop 401 in accordance with the disclosure.

The handshake request signal is transmitted by the transmitter unit 405 (via the line interface unit 420) into the subscriber loop 401. A handshake response signal received from the subscriber loop 401 is propagated to the receiver unit 410 via the line interface unit 420.

The receiver unit 410 may include some circuitry for at least partially processing the handshake response signal, before passing the results to the test system hardware 415. The computer unit 425 is communicatively coupled to not only the test system hardware 415 but to other circuitry (not shown) that may be provided in the repeater in which the remote test system 310 is located. The computer unit 425 may be also communicatively coupled to other computer units (not shown) that are located elsewhere (for example in other repeaters, and/or the CPE test system 350, and/or the head-end test system 305). The computer unit 425 may be configured to receive commands from one of these other computer units and initiate the handshake procedure and/or a line fault locating test procedure in accordance with the disclosure.

When conducting the line fault locating test procedure, the test system hardware 415 receives commands from the computer unit 425 and provides to the transmitter unit 405, one or more test signals for testing the subscriber loop 401. The test signals may be in accordance with transmission signals that are suitable for performing a time domain reflectometer (TDR) test, for example. The details of the format and operation of TDR testing will not be elaborated upon herein but are generally well known in the art.

The test signals are transmitted by the transmitter unit 405 (via the line interface unit 420) into the subscriber loop 401. Test response signals received from the subscriber loop 401 are propagated to the receiver unit 410 (via the line interface unit 420).

The receiver unit 410 may include some circuitry for at least partially processing the received test response signals before passing the results to the test system hardware 415. The test system hardware 415 passes on the results to the computer unit 425, which in turn may transmit the results to the CPE test system 350 and/or the head-end test system 305 (that are shown in FIG. 3).

In one exemplary embodiment, the results may be provided to the CPE test system 350 and/or the head-end test system 305 in the form or raw data or partially processed data that is interpreted in the CPE test system 350 and/or the head-end test system 305. However, in another exemplary embodiment, the results may be provided to the CPE test system 350 and/or the head-end test system 305 in a processed form, such as for example, a message indicating the nature and the location of one or more faults on the subscriber loop 401.

Figure 5:
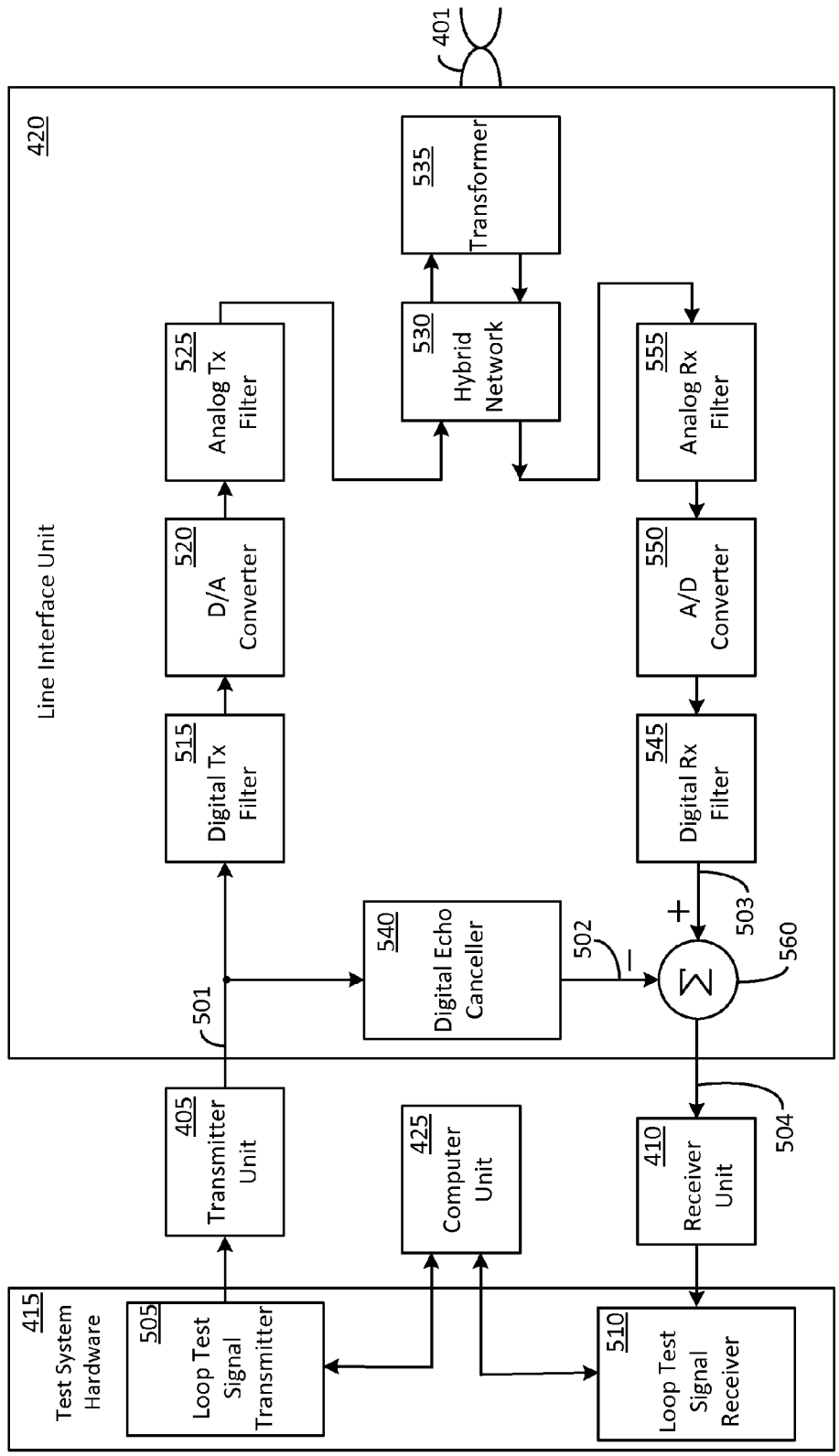
FIG. 5 shows some operative elements contained inside some functional blocks of the remote test system shown in FIG. 4.

Attention is next drawn to FIG. 5, which shows some details of a few exemplary functional blocks contained in the remote test system 310 shown in FIG. 4. The test system hardware 415 includes circuitry for executing a line fault locating test procedure in accordance with the disclosure. The circuitry includes a loop test signal transmitter 505 that may provide an impulse signal as a test signal in one exemplary embodiment. The impulse signal is coupled into the transmitter unit 405 which then propagates the impulse signal into line 501.

The loop test signal receiver 510 is configured to receive an echo response to the impulse signal when the impulse signal is reflected as a result of one or more faults in the subscriber loop 401. The line interface unit 420 includes a digital echo canceler 540, such as a linear adaptive finite impulse response (FIR) filter, coupled between the line 501 and a first input 502 of a differential summer 560.

The impulse signal on line 501 is not only coupled into the digital echo canceller 540, but also into a digital transmit filter 515. The output of the digital transmit filter 515 is coupled to a digital-to-analog converter 520 where the filtered signal provided by the digital transmit filter 515 is converted into an analog signal. The analog signal is coupled into a hybrid network 530, which in turn is coupled to a transformer 535. The analog signal constitutes the test signal that is transmitted by the remote test system 310 into the subscriber loop 401 for determining a location and a nature of one or more faults in the subscriber loop 401.

Test response signals received from the subscriber loop 401 are propagated through the transformer 535 and the hybrid network 530 to an analog receive filter 555, where the signals are filtered before coupling into an analog-to-digital converter 550. The output of the analog-to-digital converter 550, which is a digital signal at this stage, is passed through a digital receive filter 545 to a second input 503 of the differential summer 560.

With the digital echo canceler 540 implemented as a linear adaptive FIR filter, a least mean squared (LMS) algorithm (or other known adaptive FIR algorithm) may be employed to attempt to minimize an error output 504 of the differential summer 560. More particularly, when the subscriber loop 401 operates as an echo path that is linear in nature, and a number of echo canceler taps in the linear adaptive FIR filter exceeds a duration of an impulse response of this linear echo path, an echo path function Hec(f) can be approximated by a Hd(f) functionality of the linear adaptive FIR filter with a minimal amount of error. The error output 504 is coupled via the receiver unit 410, into the loop test signal receiver 510, where the error output 504 is processed in order to estimate a location and a nature of one or more faults in the subscriber loop 401.

Figure 6:
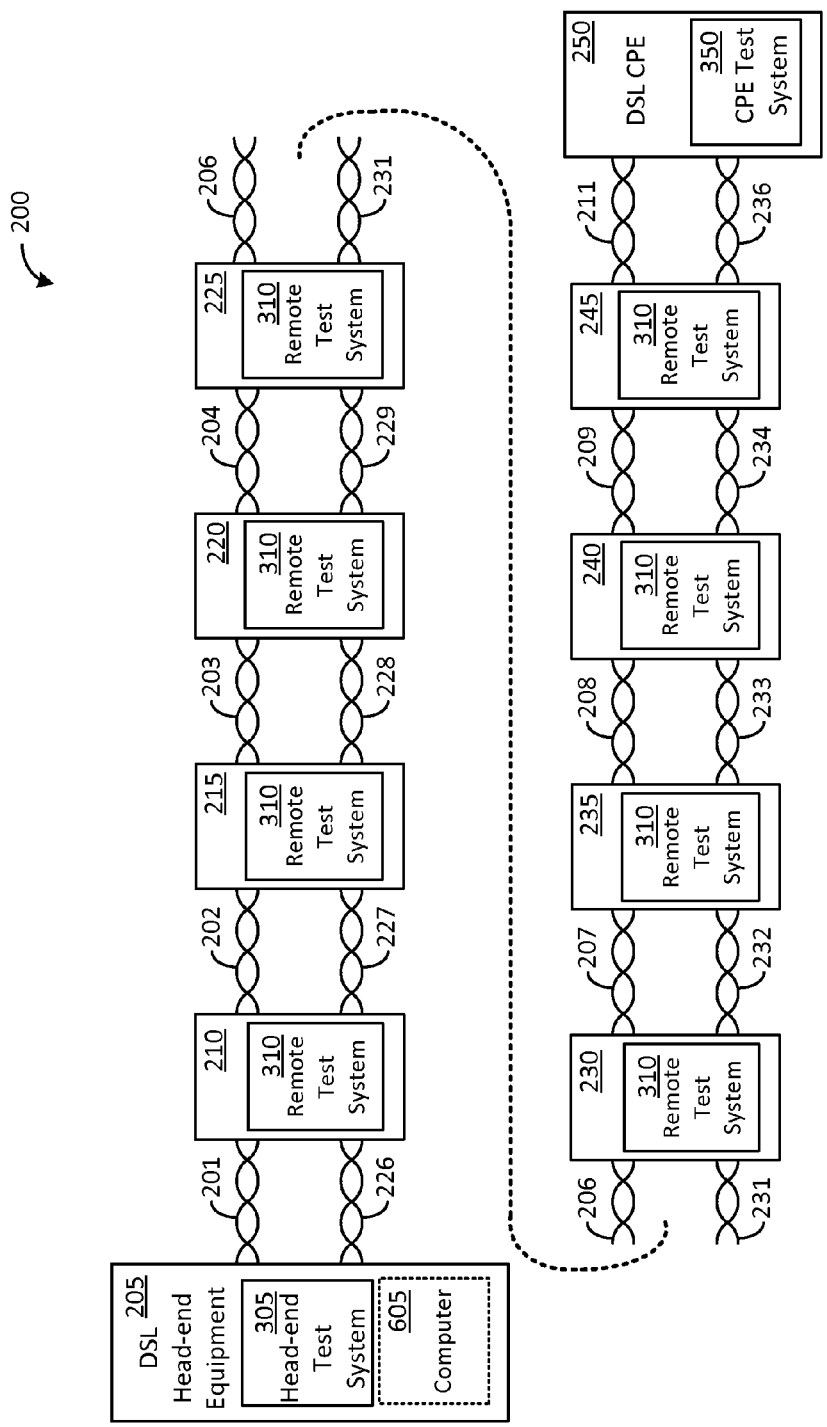
FIG. 6 shows an exemplary DSL system incorporating a digital subscriber line head-end equipment housing an exemplary computer in accordance with the disclosure.

FIG. 6 shows an exemplary DSL system 200 incorporating a digital subscriber line head-end equipment 205 housing an exemplary computer 605 in accordance with the disclosure. In some other implementations, the computer 605 or a portion of the computer 605 may be located outside the DSL head-end equipment 205.

In one exemplary embodiment, the computer 605, which is interactively coupled to the head-end test system 305, is used to initiate the handshake procedure and/or the line fault locating test procedure from the head-end test system 305 in the DSL head-end equipment 205. The computer 605 is also used to process information received by the DSL head-end equipment 205 from the various repeaters and/or the DSL CPE 250 in connection with the handshake procedure and/or the line fault locating test procedure initiated by the DSL head-end equipment 205. The processing may include the generation of the topological representation and identifying one or more faulty loop by using the topological representation.

In another exemplary embodiment, the computer 605 is used to process information received by the DSL head-end equipment 205 from the various repeaters and/or the DSL CPE 250 in connection with a handshake procedure and/or a line fault locating test procedure initiated by the DSL CPE 250.

Figure 7:
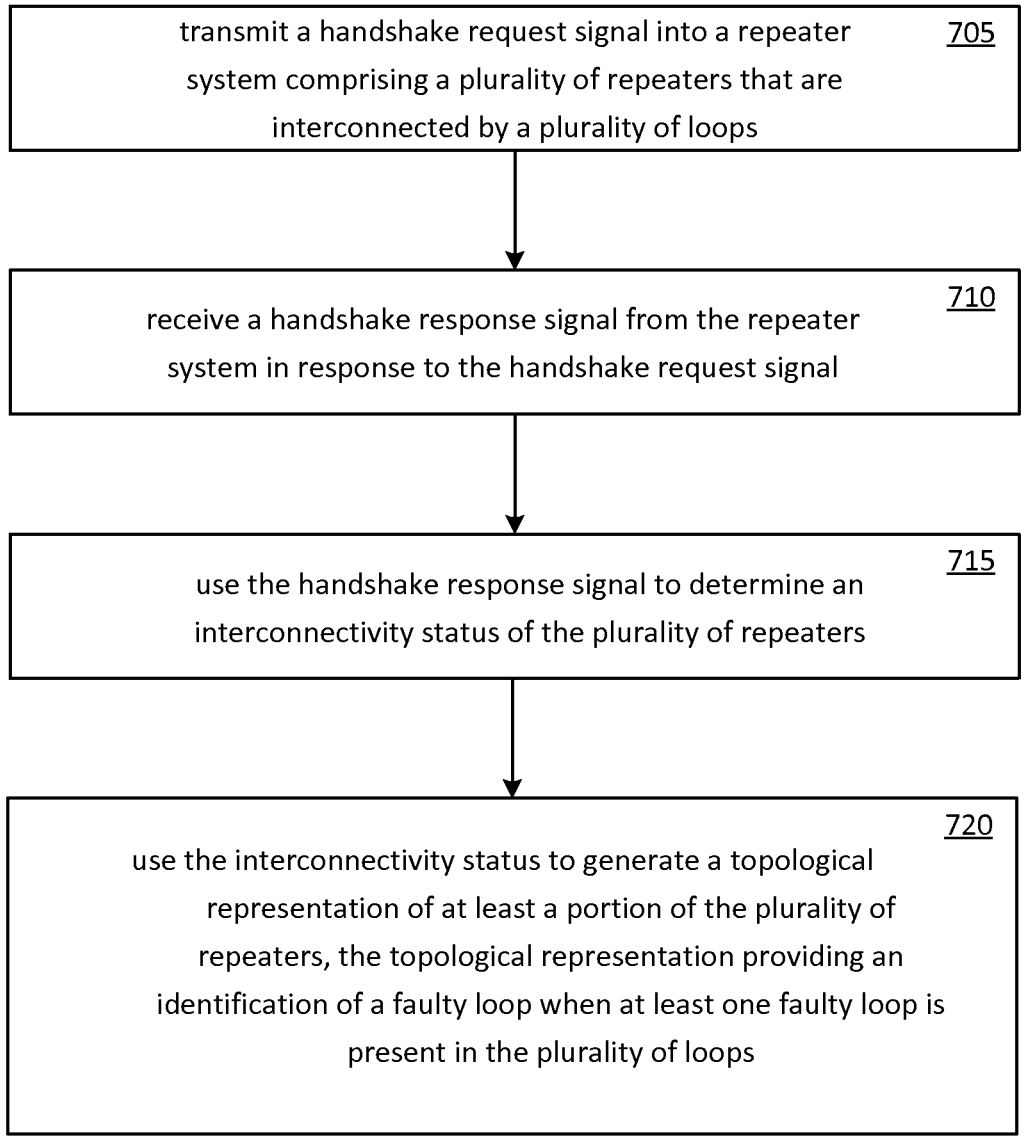
FIG. 7 shows a flowchart of an exemplary method of locating a fault in a loop network of a DSL system in accordance with the disclosure.

FIG. 7 shows a flowchart of an exemplary method of locating a fault in a subscriber loop network of a DSL system in accordance with the disclosure. In block 705, a handshake request signal is transmitted into a repeater system that includes a number of repeaters interconnected by a number of subscriber loops. An exemplary system is shown in FIG. 2 and transmitting of the handshake request signal by either the DSL head-end equipment 205 or the DSL CPE 250 is described above in greater detail.

In block 710, a handshake response signal is received from the repeater system, by the respective DSL head-end equipment 205 or the DSL CPE 250 that transmitted the handshake request signal.

In block 715, the handshake response signal is used to determine an interconnectivity status of one or more repeaters in the repeater system. More particularly, determining of the interconnectivity status is directed at identifying the status of the subscriber loops that interconnect various pairs of repeaters in the repeater system.

In block 720, the interconnectivity status is used to generate a topological representation of the entire DSL system and/or a portion of the DSL system (such as the repeater system, for example). The topological representation provides an identification of one or more faulty loops that may be present. As described above, the topological representation may be propagated to the DSL head-end equipment 205 from where this information may be forwarded to a control facility.

Generation of the topological representation may be implemented in a variety of ways. Some of these ways may be directed at providing a human-readable representation such as, for example, a graphical representation, a table, or a chart. In other cases, the topological representation may be directed at providing a machine-readable representation such as, for example, suitable instructions in software code that is executable by a processor. The machine-readable representation may be derived directly from the results of the handshaking procedure without human intervention, and testing of the faulty loop may be started without requiring input from a human operator.

In summary, it will be pertinent to point out that the methods and systems described in the present disclosure may be implemented in hardware, software, firmware or combination thereof. Features described in the form of the various functional blocks or structures may be implemented together (e.g., in a logic device such as an integrated logic device, or in a circuit board) or separately (e.g., as separate logic devices or separate circuit boards). The software portion of the methods of the present disclosure may comprise a computer-readable storage medium which comprises instructions that, when executed, perform, at least in part, the described operations and methods. The computer-readable storage medium, which excludes signals, may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

Now, therefore the following is claimed:

1. A digital subscriber line fault locating system comprising:
   a transmitter unit configured to transmit a handshake request signal into a repeater system, the repeater system comprising a plurality of repeaters and a plurality of loops interconnecting the plurality of repeaters;
   a receiver unit configured to receive a handshake response signal from the repeater system in response to the handshake request signal, the handshake response signal containing information indicative of an interconnectivity status of at least a portion of the repeater system;
   a fault analyzer configured to interpret the interconnectivity status and provide an identification of a faulty loop when at least one faulty loop is present in the plurality of loops, wherein to provide the identification of the faulty loop, the fault analyzer is configured to generate a topological representation of at least a portion of the repeater system; and
   at least one of a head-end test system or a customer premises equipment test system configured to initiate a fault test procedure to identify a location of a fault in the faulty loop, the fault test procedure executed by a remote test system located in a repeater coupled to the faulty loop,
   wherein each of the handshake request signal and the handshake response signal is in conformance to one or more industry-wide standards directed to handshaking between digital subscriber line transceivers, wherein the one or more industry-wide standards conforms to one or more of the ITU-T G.99x Recommendations, wherein the handshake request signal comprises a first combination of bits configured to operate as a fault status query message contained in a non-standard information field defined in the one or more of the ITU-T G.99x Recommendations, and wherein the handshake response signal comprises a second combination of bits configured to operate as a fault status response message contained in the non-standard information field defined in the one or more of the ITU-T G.99x Recommendations.

2. A digital subscriber line fault locating system comprising:
   a transmitter unit configured to transmit a handshake request signal into a repeater system, the repeater system comprising a plurality of repeaters and a plurality of loops interconnecting the plurality of repeaters;
   a receiver unit configured to receive a handshake response signal from the repeater system in response to the handshake request signal, the handshake response signal containing information indicative of an interconnectivity status of at least a portion of the repeater system;
   a fault analyzer configured to interpret the interconnectivity status and provide an identification of a faulty loop when at least one faulty loop is present in the plurality of loops, wherein a repeater coupled to the faulty loop is configured to perform training in a training phase across the faulty subscriber loop prior to communicating in a data phase across the faulty subscriber loop; and
   at least one of a head-end test system or a customer premises equipment test system configured to initiate a fault test procedure to identify a location of a fault in the faulty loop, the fault test procedure executed by a remote test system located in the repeater coupled to the faulty loop prior to starting of the training phase.

3. The digital subscriber line fault locating system of claim 2, wherein each of the handshake request signal and the handshake response signal is in conformance to one or more industry-wide standards directed to handshaking between digital subscriber line transceivers.

4. The digital subscriber line fault locating system of claim 3, wherein the one or more industry-wide standards conforms to one or more of the ITU-T G.99x Recommendations.

5. The digital subscriber line fault locating system of claim 2, wherein the plurality of repeaters comprises:
   a first set of repeaters that is line-powered by a digital subscriber line access multiplexer located in a central office; and
   a second set of repeaters that is line-powered by a customer premises equipment in which the customer premises equipment test system is housed, the second set of repeaters coupled to the faulty loop on which the fault test procedure is executed by the remote test system upon initiation of the fault test procedure by the customer premises equipment test system.

6. The digital subscriber line fault locating system of claim 2, wherein the faulty loop comprises a twisted pair of wires having the fault along at least one wire of the twisted pair.

7. A digital subscriber line fault locating system comprising:
- a transmitter unit configured to transmit a handshake request signal into a repeater system, the repeater system comprising a plurality of repeaters and a plurality of loops interconnecting the plurality of repeaters;
- a receiver unit configured to receive a handshake response signal from the repeater system in response to the handshake request signal, the handshake response signal containing information indicative of an interconnectivity status of at least a portion of the repeater system;
- a fault analyzer configured to interpret the interconnectivity status and provide an identification of a faulty loop when at least one faulty loop is present in the plurality of loops, wherein to provide the identification of the faulty loop, the fault analyzer is configured to generate a topological representation of at least a portion of the repeater system; and
- at least one of a head-end test system or a customer premises equipment test system configured to initiate a fault test procedure to identify a location of a fault in the faulty loop, the fault test procedure executed by a remote test system located in a repeater coupled to the faulty loop,
- wherein the plurality of repeaters comprises:
- a first set of repeaters that is line-powered by a digital subscriber line access multiplexer located in a central office; and
- a second set of repeaters that is line-powered by a customer premises equipment in which the customer premises equipment test system is housed, the second set of repeaters coupled to the faulty loop on which the fault test procedure is executed by the remote test system upon initiation of the fault test procedure by the customer premises equipment test system,
- wherein the remote test system is configured to initiate the fault test procedure prior to starting of a training phase in one or more of the second set of repeaters.

8. A digital subscriber line fault locating system comprising:
- a transmitter unit configured to transmit a handshake request signal into a first set of repeaters that is line-powered by a customer premises equipment, the first set of repeaters coupled to a second set of repeaters that is line-powered by a central office apparatus;
- a receiver unit configured to receive a handshake response signal from the first set of repeaters in response to the handshake request signal, the handshake response signal containing information indicative of an interconnectivity status of the first set of repeaters;
- a fault analyzer configured to interpret the interconnectivity status and provide an identification of a faulty loop when at least one faulty loop is present in a plurality of loops interconnecting the first set of repeaters, wherein to provide the identification of the faulty loop, the fault analyzer is configured to generate a topological representation of at least a portion of the repeater system; and
- at least one of a head-end test system or a customer premises equipment test system configured to initiate a fault test procedure to identify a location of a fault in the faulty loop, the fault test procedure executed by a remote test system located in a first repeater coupled to the faulty loop,
- wherein the remote test system is configured to initiate the fault test procedure prior to starting of a training phase in one or more of the first set of repeaters.

9. The digital subscriber line fault locating system of claim 8, wherein each of the handshake request signal and the handshake response signal is provided in a format that is in conformance to one or more industry-wide standards directed to handshaking between digital subscriber line transceivers.

10. The digital subscriber line fault locating system of claim 8, wherein the fault test procedure comprises a time domain reflector test, and wherein a result of the fault test procedure is compiled by the customer premises equipment and provided to the central office apparatus.

11. The digital subscriber line fault locating system of claim 10, wherein the result of the fault test procedure is transmitted from the customer premises equipment to the central office apparatus using at least one of: a) a first transmission format conforming to one or more of the ITU-T G.99x Recommendations or b) a second transmission format that conforms to a different standard than the one or more of the ITU-T G.99x Recommendations.

12. A method of locating a fault in a loop network of a digital subscriber line system, the method comprising:
- transmitting a handshake request signal into a repeater system, the repeater system comprising a plurality of repeaters that are interconnected by a plurality of loops;
- receiving a handshake response signal from the repeater system in response to the handshake request signal;
- using the handshake response signal to determine an interconnectivity status of the plurality of repeaters;
- using the interconnectivity status to provide an identification of a faulty loop when at least one faulty loop is present in the plurality of loops, wherein providing the identification of the faulty loop comprises generating a topological representation of at least a portion of the repeater system;
- line-powering a first set of repeaters from a central office;
- line-powering a second set of repeaters from a customer premises equipment, the second set of repeaters comprising the faulty loop on which a fault test procedure is executed by a remote test system located in a repeater that is coupled to the faulty loop, the remote test system configured to execute the fault test procedure upon receiving a command from the customer premises equipment; and
- using the topological representation to initiate the fault test procedure for identifying a location of a fault in the faulty loop, the fault test procedure initiated prior to starting a training phase in one or more of the plurality of repeaters.

13. The method of claim 12, wherein the topological representation is generated by a customer premises equipment, and further wherein:
- the plurality of repeaters is line-powered by the customer premises equipment;
- each of the transmitting of the handshake request signal and the receiving of the handshake response signal is carried out by the customer premises equipment;
- each of the handshake request signal and the handshake response signal is in conformance to one or more of the ITU-T G.99x Recommendations; and
- the fault test procedure comprises a time domain reflector test executed by a first repeater coupled to the faulty loop, the time domain reflector test executed in response to initiating of the fault test procedure by the customer premises equipment.

14. The method of claim 13, further comprising:
transmitting a result of the fault test procedure from the customer premises equipment to a central office apparatus via at least one loop other than the faulty loop.

15. The method of claim 14, wherein the result of the fault test procedure is transmitted from the customer premises equipment to the central office apparatus using at least one of: a) a first transmission format conforming to the one or more of the ITU-T G.99x Recommendations or b) a second transmission format that conforms to a different standard than the one or more of the ITU-T G.99x Recommendations.

16. The method of claim 12, wherein the topological representation is generated by a central office apparatus, and further wherein:
the plurality of repeaters is line-powered by the central office apparatus;
each of the transmitting of the handshake request signal and the receiving of the handshake response signal is carried out by the central office apparatus;
each of the handshake request signal and the handshake response signal is in conformance to one or more of the ITU-T G.99x Recommendations; and
the fault test procedure comprises a time domain reflector test executed by a first repeater coupled to the faulty loop, the time domain reflector test executed in response to initiating of the fault test procedure by the central office apparatus.

17. A method of locating a fault in a loop network of a digital subscriber line system, the method comprising:
transmitting a handshake request signal into a repeater system, the repeater system comprising a plurality of repeaters that are interconnected by a plurality of loops;
receiving a handshake response signal from the repeater system in response to the handshake request signal;
using the handshake response signal to determine an interconnectivity status of the plurality of repeaters; and
using the interconnectivity status to provide an identification of a faulty loop when at least one faulty loop is present in the plurality of loops, wherein a repeater coupled to the faulty loop is configured to perform training in a training phase across the faulty subscriber loop prior to communicating in a data phase across the faulty subscriber loop; and
initiating, based on the interconnectivity status and prior to the training phase, a fault test procedure to identify a location of a fault in the faulty loop.

18. The method of claim 17, wherein providing the identification of the faulty loop comprises generating a topological representation of at least a portion of the repeater system, and further comprising:
line-powering a first set of repeaters from a central office; and
line-powering a second set of repeaters from a customer premises equipment, the second set of repeaters comprising the faulty loop on which the fault test procedure is executed by a remote test system located in the repeater that is coupled to the faulty loop, the remote test system configured to execute the fault test procedure upon receiving a command from the customer premises equipment.

19. The method of claim 17, wherein the faulty loop comprises a twisted pair of wires having the fault along at least one wire of the twisted pair.

20. A digital subscriber line fault locating system comprising:
a transmitter unit configured to transmit a handshake request signal into a repeater system, the repeater system comprising a plurality of repeaters and a plurality of loops interconnecting the plurality of repeaters, wherein the handshake request signal is part of a handshake messaging procedure;
a receiver unit configured to receive a handshake response signal from the repeater system in response to the handshake request signal, the handshake response signal containing information indicative of an interconnectivity status of at least a portion of the repeater system;
a fault analyzer configured to interpret the interconnectivity status and provide an identification of a faulty loop when at least one faulty loop is present in the plurality of loops; and
at least one test system configured to initiate a targeted line fault test procedure based on the identification of the faulty loop by the handshake messaging procedure.

21. The digital subscriber line fault locating system of claim 20, wherein the at least one test system comprises a remote test system and at least one of a head end test system or a customer premises equipment test system, and wherein the plurality of repeaters comprises:
a first set of repeaters that is line-powered by a digital subscriber line access multiplexer located in a central office; and
a second set of repeaters that is back-powered by a customer premises equipment in which the customer premises equipment test system is housed, the second set of repeaters coupled to the faulty loop on which the targeted line fault test procedure is executed by the remote test system that is housed in a repeater coupled to the faulty loop.

* * * * *